United States Patent [19]

Wade

[11] Patent Number: 5,184,644
[45] Date of Patent: Feb. 9, 1993

[54] SOLENOID OPERATED PRESSURE REGULATING VALVE

[75] Inventor: Richard A. Wade, Royal Oak, Mich.

[73] Assignee: Coltec Industries Inc., New York, N.Y.

[21] Appl. No.: 707,657

[22] Filed: May 30, 1991

[51] Int. Cl.⁵ .......................................... F15B 13/043
[52] U.S. Cl. ............................ 137/625.64; 137/625.61
[58] Field of Search ........................ 137/625.61, 625.64

[56] References Cited

U.S. PATENT DOCUMENTS

| | | |
|---|---|---|
| 2,267,515 | 12/1941 | Wilcox et al. ................... 137/625.65 |
| 2,868,494 | 1/1959 | Kearns, Jr. et al. ........... 251/129.14 |
| 2,896,588 | 6/1959 | Hayner et al. . |
| 3,285,285 | 11/1966 | Bielefeld ......................... 137/625.65 |
| 3,307,585 | 3/1967 | Schilling et al. ............... 137/625.27 |
| 3,349,801 | 10/1967 | Grundmann ..................... 137/627.5 |
| 3,430,656 | 3/1969 | Hawk .............................. 137/625.61 |
| 3,498,330 | 3/1970 | Paige ............................... 251/129.21 |
| 3,521,854 | 7/1970 | Leiber et al. . |
| 3,529,620 | 9/1970 | Leiber ............................. 281/129.18 |
| 3,651,833 | 3/1972 | Piko ................................. 137/625.65 |
| 3,789,735 | 2/1974 | Tam et al. .......................... 91/1 |
| 3,828,818 | 8/1974 | Hunt ................................ 137/625.65 |
| 3,856,047 | 12/1974 | Takayama ........................ 137/625.61 |
| 4,312,360 | 1/1982 | Leiber et al. .................... 137/625.65 |
| 4,320,781 | 3/1982 | Bouvet et al. ................... 137/625.65 |
| 4,338,966 | 7/1982 | Smith ............................... 137/625.65 |
| 4,391,292 | 7/1983 | Millar .............................. 137/596.17 |
| 4,507,707 | 3/1985 | Willis .................................. 361/380 |
| 4,513,780 | 4/1985 | Evans .............................. 137/625.65 |
| 4,522,371 | 6/1985 | Fox et al. . |
| 4,538,643 | 9/1985 | Goedecke ....................... 137/625.64 |
| 4,556,085 | 12/1985 | Warrick ........................... 137/625.65 |
| 4,567,910 | 2/1986 | Slavin et al. ....................... 137/82 |
| 4,576,200 | 3/1986 | Janecke et al. ............ 137/628.64 X |
| 4,578,662 | 3/1986 | Slavin .............................. 137/625.65 |
| 4,579,145 | 4/1986 | Leiber et al. .................... 137/625.65 |
| 4,610,267 | 9/1986 | Beck et al. ...................... 137/596.17 |
| 4,655,249 | 4/1987 | Livet ................................. 137/625.5 |
| 4,674,613 | 6/1987 | Sikorski ............................... 192/52 |
| 4,678,006 | 7/1987 | Northman ....................... 137/596.17 |
| 4,711,265 | 12/1987 | Davis et al. ..................... 251/129.21 |
| 4,718,454 | 1/1988 | Appleby .......................... 137/625.65 |
| 4,756,331 | 7/1988 | Stegmaier .......................... 137/271 |
| 4,785,848 | 11/1988 | Leiber .............................. 137/596.17 |
| 4,821,770 | 4/1989 | Parrott et al. ................... 137/596.17 |
| 4,860,792 | 8/1989 | Ichihashi et al. ............... 137/596.17 |
| 4,860,794 | 8/1989 | Parrott et al. ............... 137/596.17 X |
| 4,861,068 | 8/1989 | McCabe ............................. 280/714 |
| 4,875,501 | 10/1989 | Ichihashi et al. ........... 137/625.61 X |
| 4,913,189 | 4/1990 | Kline et al. ........................ 137/884 |
| 4,917,150 | 4/1990 | Koch et al. ..................... 137/625.65 |
| 4,922,961 | 5/1990 | Maehara ..................... 251/129.21 X |
| 4,932,439 | 6/1990 | McAuliffe, Jr. ................ 137/625.65 |
| 4,966,195 | 10/1990 | McCabe .......................... 137/628.61 |
| 4,971,114 | 11/1990 | Ichihashi et al. ............... 137/625.65 |
| 4,998,559 | 3/1991 | McAuliffe, Jr. ................ 137/596.17 |
| 5,009,250 | 4/1991 | Kline et al. ..................... 137/596.17 |
| 5,060,695 | 10/1991 | McCabe ..................... 137/628.64 X |

FOREIGN PATENT DOCUMENTS

| | | |
|---|---|---|
| 1157871 | 11/1963 | Fed. Rep. of Germany ......................... 137/625.65 |
| 1100189 | 9/1955 | France . |
| 543767 | 5/1956 | Italy .............................. 137/596.17 |
| 58-156784 | 9/1983 | Japan ............................. 137/625.64 |
| 149676 | 7/1986 | Japan ............................. 137/625.61 |
| 62-110085 | 5/1987 | Japan ............................. 137/625.64 |
| 294989 | 4/1971 | U.S.S.R. ........................ 137/625.65 |
| 316075 | 11/1971 | U.S.S.R. ........................ 137/625.65 |
| 469852 | 8/1975 | U.S.S.R. ........................ 137/596.17 |
| 740225 | 11/1955 | United Kingdom .......... 137/625.64 |
| 2103390 | 2/1983 | United Kingdom .......... 137/625.64 |

Primary Examiner—Gerald A. Michalsky
Attorney, Agent, or Firm—Howard S. Reiter

[57] ABSTRACT

A pressure control device, preferably for use in a control system of an automatic transmission of a motor vehicle, is shown as having a solenoid motor assembly the armature of which, through a cooperating servo orifice, is effective for varying the magnitude of pressure of a fluid medium acting upon a spool slave-like valving member. The spool valving member has at least two cylindrical axially spaced valving portions with one of such valving portions having a diametrical dimension substantially greater than that of the other of the at least two cylindrical axially spaced valving portions.

9 Claims, 2 Drawing Sheets

SOLENOID OPERATED PRESSURE REGULATING VALVE

FIELD OF THE INVENTION

This invention relates generally to pressure control devices for regulating the pressure of a fluid medium and employable, for example, in a control system of an automatic transmission of a motor vehicle.

BACKGROUND OF THE INVENTION

The prior art has proposed pressure control devices, for use in a control system of an automatic transmission of an automotive vehicle, and a typical prior art pressure control device is disclosed in U.S. Pat. No. 4,579,145 issued Apr. 1, 1986, with the patentee being Heinz Leiber et al. Said Patent discloses a pressure control device having a housing which encases an electrically energizable field coil and an armature. A spool valve carried within a spool valve housing is movable therein as to control the pressure of a fluid medium passing therethrough. The spool valve is moved in response to a plunger, and the like, positioned by the armature so that the plunger, in effect, acts directly upon the spool valve and the position and motion of the plunger and spool valve are effectively in unison with the armature.

Various problems and difficulties exist in such prior art devices as disclosed by said Patent. For example, only relatively low magnetic forces are available to cause movement of the spool valve resulting in poor response time and presenting a potential fouling. As already indicated, the axial position of the spool valve is always dependent upon the position of the armature which, in turn, requires the hydraulic forces to enter into the armature force balance and allows parasitic forces to be transmitted by the spool valve to the armature and such has a substantial effect on the regulation performed by such prior art devices. Further, it is somewhat difficult, and significantly costly, to manufacture such prior art devices because of the need to maintain precise dimensional relationships, especially axially, between and among the armature, spool valve and the cooperating ports controlled by the spool valve.

The foregoing problems, at least to a great extent, have been overcome by the teachings of U.S. Pat. No. 4,966,195 issued Oct. 30, 1990, with the patentee being Ralph P. McCabe. However, in some respects the pressure regulator assembly of U.S. Pat. No. 4,966,195 still requires significant manufacturing costs as by the use of dual springs at opposite ends of the spool valve and by conveying fluid pressure as from its output or control pressure chamber, to the functional outer-most axial end of the spool valve, as a feed-back pressure.

The invention as herein disclosed and described is primarily directed to the solution of the foregoing as well as other related and attendant problems of the prior art.

SUMMARY OF THE INVENTION

According to one aspect of the invention, a pressure regulating assembly for regulating the pressure of a flowing fluid medium, comprises housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially confined between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, wherein the diametrical dimension of said first cylindrical valving portion is substantially different from the diametrical dimension of said second cylindrical valving portion, and resilient means normally resiliently urging said spool valve in a direction generally toward further increasing communication between said annular chamber and said third fluid outlet passage means.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENT

Figure 1:
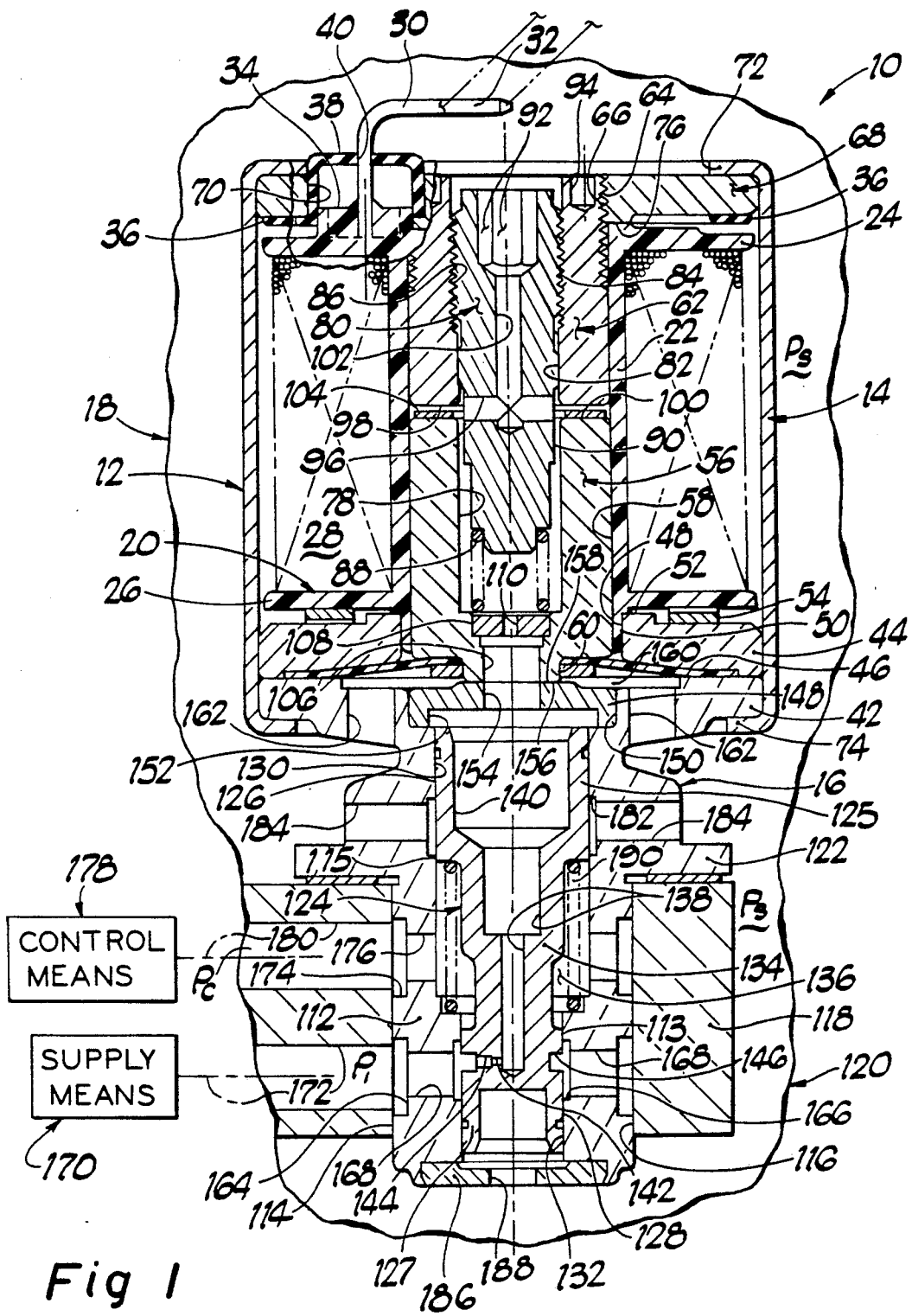
FIG. 1 is a generally axial cross-sectional view of a pressure regulating device employing teachings of the invention.

Referring in greater detail to the drawings, FIG. 1 illustrates a pressure regulating apparatus or assembly 10 as comprising housing means 12 which, in turn, is shown as comprising housing portions or sections 14 and 16.

Housing section 14 may be considered as containing, and comprising, electromagnetic motor means 18. The electromagnetic motor means 18 is preferably comprised of a bobbin 20 having a generally tubular portion 22 with outwardly radiating axially spaced flange portions 24 and 26. An electrically energizable field coil 28, carried about tubular portion 22 and axially contained by and between flanges 24 and 26, has its conductor ends respectively connected to terminals or contacts 30 and 32.

The bobbin 20 is preferably formed of a dielectric plastic material and at its upper flange 24 provided with boss-like portions, one of which is typically shown at 34, which respectively receive and hold the terminals 30 and 32. In the preferred embodiment such bosses are integrally formed with flange 24 in a manner as to be of the same radial distance but angularly spaced from each other.

A preferably dielectric plastic ring-like member 36 has two inverted cup-like portions, one of which is typically shown at 38, which respectively receive the two boss-like portions. Each of the inverted cup-like portions is provided with a slot 40 for enabling the passage therethrough of the respective terminals 30 and 32.

An annular flange-like portion 42 of housing section or body 16 is received within and against the inner cylindrical flux return member 44 is similarly received by housing body 14 and in axial abutment with flange 42 in a manner whereby a generally outer peripheral portion of a diaphragm 46 is sealingly retained therebetween. The flux return member 44 is formed with an axially extending cylindrical passage 48 which closely receives an axially extending cylindrical pilot portion 50 of bobbin 20. As depicted, bobbin 20 is preferably provided with an annular abutment shoulder for engaging an upwardly (as viewed in FIG. 1) directed annular abutment surface or shoulder 52 carried by flux return ring or member 44.

A ring-like or annular wave-type spring 54 is provided as to continually resiliently urge flux return member 44 and bobbin 20 in relatively opposite axial directions.

A cup-like cylindrical armature 56 is slidably received within an axially extending cylindrical inner surface or passage 58. The lower end of armature 56 is provided as with an axially extending cylindrical portion 60, of relatively reduced diameter, which is depicted as receiving thereabout the inner peripheral portion of diaphragm 46 which is retained thereon as by a pressed-on retainer ring.

A generally tubular cylindrical pole piece 62, closely received within cylindrical passage 58, is provided with outer thread means 64 for threadable engagement with cooperating internal threads 66 of an upper annular or ring-like flux member 68. As typically depicted at 70, the flux member 68 is provided with clearance-like passages or openings for the reception therein of the inverted cup-like portions one of which is typically shown at 38.

As can be seen, when the opposite end portions 72 and 74 of housing body 14 are formed over axially outer surfaces of upper flux ring 68 and flange portion 42 of housing body 16, the inner annular shoulder or abutment surface 76 of upper flux ring 68 is urged against bobbin body 20 (in the direction of flange portion 42) while the flange 42, through lower flux ring 44 and its shoulder or abutment surface 52, urges bobbin 20 in the opposite axial direction (generally toward upper flux ring 68) thereby containing such members or elements in axially assembled condition. If for some reason less than a totally axially abutting condition should occur, the wave spring 54 serves to assure that no relative axial movement will occur during operation as between and/or among flange 42, flux ring 44, bobbin 20 and upper flux ring 68 (and pole piece 62 threadably engaged with flux ring 68).

A combination flow member and adjustable spring seat member 80 is received within both a passage or chamber 78 of armature 56 and passage 82 of pole piece 62. Preferably, member 80 is closely piloted within passage 82, as by a coacting outer cylindrical portion, and provided with an externally threaded portion 84 coacting with an internally threaded portion 86 of pole piece member 62. In the preferred embodiment, adjustable member 80 is formed of non-magnetic stainless steel.

The lower end (as viewed in FIG. 1) of adjustment member 80 is provided with an axially extending pilot-like portion and an annular shoulder thereabout for operatively piloting and engaging the upper end of resilient means 88, such as a coiled compression spring, the lower end of which operatively engages an inner axial end wall or shoulder of passage or chamber 78 as to thereby resiliently urge armature means 56 in a downward direction as viewed in FIG. 1.

An axially extending portion of adjustment member 80 is preferably made to provide for a controlled clearance with respect to the cylindrical inner surface of chamber 78. More particularly, in one embodiment of the pressure regulating apparatus 10, the total specified diametrical clearance as between the outer cylindrical portion 90, of member 88, and the juxtaposed inner cylindrical surface of chamber or passage means 78, ranged from 0.37 mm. to 0.49 mm. with the difference therebetween being allowable dimensional tolerance.

The upper end of adjustment means 80 is provided with socket-like tool-engaging surface means 92, whereby member 80 may be threadably axially adjusted relative to pole piece 62, while the tool-engaging surface means for pole piece 62, preferably, take the form of a plurality of recesses 94—94 in the upper axial end thereof as to enable the engagement therewith of a spanner wrench, or the like, for the threadable axial adjustment of pole piece 62 relative to flux path member 68. Adjustment means 80 is also provided with transverse passage or conduit means 96 which serve to communicate as between the generally annular space, between pole piece end face means 98 and opposed armature end face means 100, and axially extending passage or conduit means 102. In the preferred embodiment, a ring-like or annular spacer 104 is situated in the space between opposed end faces 98 and 100 of pole piece 62 and armature 56, respectively. Further, in the preferred embodiment, the spacer 104 is formed of non-magnetic material as, for example, half-hard brass.

The lower axial end (as viewed in FIG. 1) of armature means 56 has passage or conduit means 106 formed therethrough as to, generally, communicate from an area axially outwardly of extension 60 to the passage or chamber means 78 of armature 56. Fluid flow restriction means 108, having calibrated flow passage means 110, is situated as in conduit means 106 to thereby provide for a restricted flow of fluid therethrough and into chamber or passage means 78.

Housing section or portion 16 is illustrated as comprising a housing body 112, of which flange portion 42 preferably comprises an integral portion, having an outer cylindrical surface 114 operatively received as in an inner cylindrical surface 116 of associated support structure 118 carried as by an automotive power transmission means 120. As illustrated, the body 112, of non-magnetic material, may have suitable flange means 122 by which the body 112 can be suitably secured to structure 118.

A spool valve member 124, preferably of aluminum alloy, having axially spaced first and second generally tubular valve portions 125 and 127 with outer cylindrical surfaces 126 and 128 respectively carried thereby, is slidably received within a cooperating passage comprising at least a first axially extending cylindrical surface 130 and a second relatively smaller axially extending cylindrical surface 132 which may be considered as being in communication with each other. As shown, valve body portion 125 is closely slidably received within passage portion 130 while valve body portion 127 is closely slidably received within passage portion 132.

Valve body portions 125 and 127 are joined to each other by an axially extending intermediate body portion 134. Preferably, body portion 134 has a cylindrical outer surface of generally reduced diameter, or diameters, thereby forming, in combination with passages 130 and 132, annular chamber or passage means 136. Spool valve member 124 is provided with axially extending passage or conduit means 138 effectively communicating with a recess or cavity 140, formed axially into valve body portion 125, and a calibrated flow restriction 142 which communicates, as through a conduit portion 144, with an annular circumferentially formed recess or groove 146.

In the preferred embodiment, a generally cylindrical valve seat or poppet valve seat member 148, preferably of non-magnetic stainless steel, is sealingly pressed into a recess 150 in valve housing or body 112. In the embodiment shown, a chamber 152 is formed as to be axially of valve body portion 125 and larger in diameter than the outer cylindrical surface 126 of valve body portion 125. A passage or aperture 154, generally centrally formed through valve seat member 148, communicates with chamber or cavity 152 and cavity 140. When the apparatus 10 is in a condition wherein the armature 56 is in its down-most position (as viewed in FIG. 1), an annular valving surface 156, formed generally circumferentially about passage or conduit means 106 and carried by armature means 56, sealingly abuts against a cooperating valve seating surface 158 of valve seat means 148.

A chamber 160 is formed generally between diaphragm means 46 and the flange (42) end of housing section means 16. A plurality of apertures or passages 162, formed in housing section 16, serve to communicate between chamber 160 and an area relatively low reference or sump pressure, $P_s$. For purposes of disclosure, it may be assumed that the apparatus 10 and related cooperating support structure 118 are situated as to be generally surrounded by a relatively low reference, or sump, fluid pressure $P_s$.

A first recess or groove 164 is formed circumferentially into the outer surface 114 of housing portion 112 while a second recess or groove 166 is formed circumferentially into inner passage 132. A plurality of generally radially extending passages or conduits 168 serve to complete communication between recesses or grooves 164 and 166. A relatively high pressure source or supply means 170, for supplying a fluid at a relatively high pressure, is in communication with annular groove or flow path 146 as via inner annular groove 166, conduit means 168, annular groove or recess 164 and conduit or passage means 172.

Similarly, an annular groove or recess 174 is formed generally peripherally into the outer surface 114 and is placed into communication with inner space or chamber means 136 as by a plurality of conduits or apertures 176. A control means 178 to be acted upon by fluid pressure, regulated or determined by valving means 124, is in communication with chamber 136, conduits or passages 176 and recess or flow ring 174 as via conduit or passage means 180.

A further annular groove or recess 812 is formed generally peripherally into the inner surface 130, of housing body 112, and placed into communication with said area of sump pressure as by conduit or passage means 184.

In the preferred embodiment, an end cap member 186, of generally disc-like configuration, is retained as within a bore formed in the lower end (as viewed in FIG. 1) of housing section or body 112. An aperture or passage 188, formed through end cap member 186, completes communication as between the fluid of low or sump pressure and conduit portion 132 axially beyond the outer end of valving body 127.

in the embodiment of FIG. 1, a resilient means such as, for example, a coiled compression spring 190 is situated in the control chamber means 136 and normally resiliently urges the spool valve 124 upwardly (as viewed in FIG. 1) or toward poppet valve seat member 148.

OPERATION OF EMBODIMENT OF FIG. 1

Generally, the pressure regulating valving assembly 10, controls and/or determines fluid output pressure in response to an electrical current, as by returning a portion of such fluid to, for example, sump. More particularly, an electrical signal, in which the magnitude of the current may be an indication of a sensed condition or an indication of the then desired operation of the control means 178, is applied to the field winding 28, as by terminals 30 and 32. This, in turn, creates a magnetic field with the path of the resulting flux being generally axially through pole piece 62, through flux ring or member 68, through housing section 14, through flux member 44, generally axially along armature means 56 and back to pole piece means. The calibrated spring means 88 resiliently resists the movement of armature means 56 away from valve seat member 148; however, generally, the greater the magnitude of the electrical current applied to the field coil means 28 the further will armature means 56 move, away from valve seat member 148, against the resilient resistance of spring means 88. In the preferred form of the embodiment of FIG. 1, the spring means 88 is adjusted, via adjustment means 80, as to apply an initial biasing force tending to maintain armature means 56 seated against valve seat member 148, thereby requiring a corresponding or related predetermined magnitude of electrical current to be first applied to field coil means 28 before the armature means 56 undergoes any opening movement with respect to valve seat member 148.

For ease of disclosure and understanding, the magnitude of the pressure of fluid provided by supply means 170 may be considered as being of constant relatively high magnitude, $P_1$. Assuming that armature means 56 is held against valve seat member 148, it can be seen that fluid at a supply pressure $P_1$ will flow into recess or groove 146, through conduit 144 and calibrated flow restriction 142, into passage or conduit means 138, into chamber or cavity 140 and into the chamber means 152. Some of such fluid flows into passages or conduits 154 and 106 with a small portion flowing through calibrated passage 110 of restriction means 108. As a consequence, the magnitude of fluid pressure in chamber 152, cavity or chamber 140, and conduits or passages 138 is at its maximum while the opposite end, valve body portion 127, is exposed to the low sump pressure $P_s$. This, in turn causes the spool valve member 124 to axially move a maximum distance, against the resistance of spring means 190, thereby assuredly terminating communication as between control chamber 136 and conduit means 184 while, simultaneously, opening communication as between recess means 166 and control chamber 136. The magnitude of the fluid pressure within control chamber 136 increases to its maximum value causing $P_c$ to approach the value of $P_1$.

The various clearance in the electromagnetic motor means 18 are filled with fluid. In order to continually assure that all air is purged, fluid is flowed through calibrated restriction passage means 110 and into the chamber within armature means 56.

As was previously described, there is a calculated, very small annular passage between the outer surface of cylindrical portion 90 and the juxtaposed portion of spaced inner cylindrical surface 78. The restrictive effect thereof, to flow of fluid therethrough, is such as to preferably provide a rate of flow just slightly less than the rate of flow through said calibrated restrictive passage means 110. The fluid flowing through the tubular-like flow passage, between 90 and 78, flows into the annular space generally between opposed faces 98 and 100 and flows into the space between the outer cylindrical surface of armature means 56 and the juxtaposed inner cylindrical surface 58 of bobbin means 20. Because of the movement which armature means 56 undergoes, relative to bobbin means 20, the fluid therebetween generally circulates and eventually flows to sump as via radial passage means 96 and axial passage means 102, as well as the tool engaging socket 92. Such circulation of fluid results in the continuing assurance that any pockets of air, which may occur, are purged to sump.

When the magnitude of the electrical current applied to the field coil means 28 becomes sufficient to have the magnetic force of the generated flux overcome the pre-load of spring means 88, the armature 56 will start to move toward pole piece means 62 and as this occurs, the valving end surface 156 moves away from valve seating surface 158 of valve seat member 148. The magnitude of the electrical current necessary to thusly overcome the pre-load of spring 88 may be considered to be a "threshhold" value or magnitude of current. As should now be evident, the greater the magnitude of the current, the more armature means 56 moves away from valve seat member 148 and toward pole piece means 62. As the armature means 56 undergoes such motion, fluid flows out of passage means 154, between spaced surfaces 156 and 158 and into chamber 160 which is at or very close to sump pressure, $P_s$. Such fluid is then able to pass through conduit means 162—162. As a consequence, the magnitude of the pressure of fluid in chamber 152, chamber or cavity 140, and passages 138 decreases because of the restriction 142 and the relatively less restricted flow out of passage 154. This, in turn, enables the magnitude of the pressure of fluid in chamber 136 to work against the spool valve 124 in conjunction with the biasing resilient means 190 to move spool valve 124 upwardly (as viewed in FIG. 1) opening or further increasing communication as between control pressure chamber 136 and bypass-like passage means 182, 184 to sump, while communication as between annulus 166 and control chamber 136 is being reduced by the cylindrical surface 128.

EMBODIMENT OF FIG. 2

Figure 2:
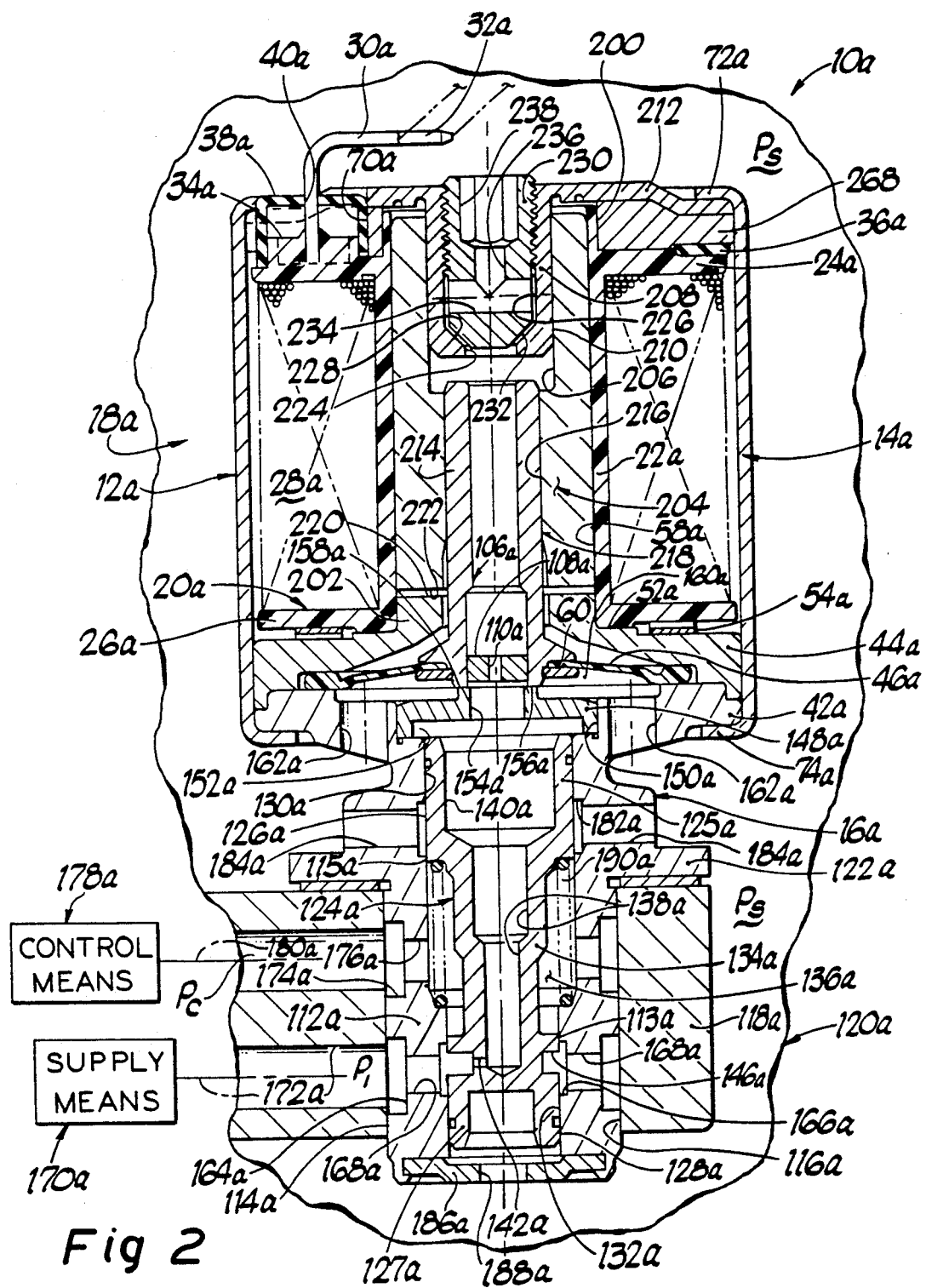
FIG. 2 is a generally axial cross-sectional view of another pressure regulating device employing teachings of the invention.

In FIG. 2 all elements and/or details which are like or similar to those of FIG. 1 are identified with like reference numbers provided with a suffix "a".

Referring in greater detail to FIG. 2, the electromagnetic motor means 18a, in addition to the elements thereof which are identified as being like or similar to those of FIG. 1, comprises a generally annular or ring-like flux member 268 which is preferably piloted on and about a cylindrical pilot portion or extension 200 of bobbin 20a.

The flange portion 42a is in axially abutting condition with a flux member 44a, which also comprises pole piece means 202 pilotingly received in the lower (as viewed in FIG. 2) end of the tubular cylindrical body portion 22a as to have the inner cylindrical surface 58a preferably closely received about the pole piece means 202.

A generally cylindrical armature 204 has its upper end (as viewed n FIG. 2) of a generally cup-shaped configuration wherein the inner cylindrical wall 206 is closely received about and axially slidable relative to a depending generally cylindrical portion 208. In one embodiment of the structure of FIG. 2, it was determined that a diametrical clearance, between the outer cylindrical surface 210, of portion 208, and the inner cylindrical surface 206 of armature 204 could be from 0.19 mm. to 0.29 mm. with the difference therebetween being permissible dimensional tolerances.

The generally tubular depending portion 208 is preferably formed integrally with a generally transversely extending end plate member 212 which is preferably formed of non-magnetic stainless steel and provided with suitable openings for respectively accommodating the boss-like portions one of which is typically shown at 38a.

An annular flange-like portion 42a of housing section or body 16a is received within and against the inner cylindrical surface of housing section or body 14a. The flux member 44a is similarly received by housing or body 14a and is in axial abutment with flange portion 42a in a manner whereby a generally outer peripheral portion of a diaphragm 46a is sealingly retained therebetween.

When the elements are assembled and the ends 72a and 74a of outer housing section or body 14a are formed over as depicted, flux washer 268 presses axially downwardly (as viewed in FIG. 2) against bobbin flange 24a, causing the lower disposed annular surface of bobbin 20 to bear against a juxtaposed annular abutment surface or shoulder 52a carried by the flux member 44a and consequently having the flux member 44a abut against body flange 42a and in so doing retaining the outer peripheral portion of diaphragm means 46a therebetween.

In the preferred embodiment of the structure of FIG. 2, an axial adjustment member 214 is provided in cooperation with armature means 204. More particularly, armature means 204 has a cylindrical passage or bore 216, formed centrally and axially thereof, and which receives the adjustment member 214 therein as by a press-fit between bore 216 and outer cylindrical surface 218 of member 214. In assembling adjustment member 214 and armature 204, the armature 204 is pressed onto member 214 until the desired working gap, as between pole piece end face means 220 and armature end face means 222, is achieved, such, of course, being possible to establish in terms of the axial distance of valve seating surface 156a to the armature end face means 222.

Cylindrical portion 208 is provided with an inlet aperture or passage 224 leading as to a cylindrical chamber 226 which has a seat-like surface 228 depicted as being generally conical. An adjustable member 230, having an axial end 232 effective for cooperating with seat-like surface 228, is threadably engaged with portion 208 to thereby enable the selective adjustment of end 232 relative to conical surface 228 as to achieve a desired restricted rate of fluid flow therebetween and into the remainder of cylindrical chamber 226. Member 230 has passage or conduit means 234 formed generally transversely and opening, at both ends, into cylindrical chamber 226. An axially extending conduit or passage 236 serves to communicate between conduit means 234 and a socket-like tool-engaging surface means 238 thereby being in communication with sump pressure, $P_s$.

In the preferred form of the embodiment of FIG. 2, axially extending adjustment member 214, extension 208, adjustment member 230 and end member 212 are all formed of non-magnetic material. Preferably, members 212, 214 and 230 are of non-magnetic stainless steel, while the spool valve 124a and housing 16a are of aluminum alloy.

A visual inspection of both FIGS. 1 and 2 will show that the details and elements comprising the spool valve, spool valve housing or body and the various conduits, passages, porting and apertures are functionally the same.

That is, the valving assembly preferably employs a poppet orifice 154a (154), in series with a fluid feed or supply restriction 142a (142), to vary a pressure which acts directly on the spool valve 124a (124). A regulating poppet valve 156a (156) is employed to vary the magnitude of the fluid pressure at the poppet orifice means 154a (154).

As already indicated, the poppet regulating valve 156a (156) may, in fact, be positioned some small distance, for example 0.005 inch, away from the poppet valve seat surface 158a (158) and, depending upon such distance, fluid flow is restricted across seating surface means 158a (158) which, in turn, creates a back pressure at poppet orifice means 154a (154) with such back pressure being transmitted to chamber 152a (152), cavity or passage means 140a (140) and passage means 138a (138) of spool valve 124a (124).

Fluid at a supply pressure, $P_1$ is fed as through conduit means 172a (172), through annulus 164a (164), conduit means 168a (168), annulus 146a (146), and, through calibrated restriction means 142a (142) to spool valve 124a (124) passage and/or chamber means 138a (138) and 140a (140). As the magnitude of the fluid pressure within 138a (138), 140a (140) and 152a (152) thusly increases, the spool valve 124a (124) experiences an increasing axially directed force which is in a direction opposed to by the magnitude of the pressure of fluid in chamber 136a (136) and the spring means 190a (190).

When such a hydraulic force axially against spool valve 124a (124) becomes sufficient to overcome the force of spring 190a (190), the spool valve 124a (124) will begin to move axially away from poppet valve seat member 148a (148) and toward end cap member 186a (186) and exhaust port or passage 188a (188). Such movement by spool valve 124a (124), toward exhaust port 188a (188), causes the supply port regulating surface 113a (113), which comprises a portion of the outer cylindrical surface 128a (128), to effectively decrease thereby allowing more fluid, at $P_1$, to flow out of annulus 166a (166) and into control chamber 136a (136). Simultaneously, as regulating surface 113a (113) is thusly decreasing, the exhaust port regulating surface 115a (115), which comprises a portion of the outer cylindrical surface 126a (126), increases and increasingly restricts fluid flow out of control chamber 136a (136) and into annulus 182a (182) and exhaust passage or conduit means 184a—184a (184—184) to sump. The combination of the extra flow of fluid into control chamber 136a (136) and the reduction of fluid flow out of control chamber 136a (136) and into exhaust passage means 184a—184a (184—184) will create a magnitude of control pressure within control chamber 136a (136) which will act upon the spool valve 124a (124) and bring the spool valve 124a to a condition of rest with the various hydraulic forces and spring force being in equilibrium.

The difference in the diametrical dimensions of spool valve cylindrical portions 126a (126) and 128a (128) enables the spool valve 124a (124) to achieve a state of equilibrium with a magnitude of fluid pressure in control chamber 136a (136) greater than the then magnitude of fluid pressure in cavities or chambers 152a (152), 140a (140) and 138a (138).

In the embodiments of FIGS. 1 and 2, the spool spring means 190a (190) is capable of providing a balancing force to maintain a zero pressure in the control chamber 136a (136) when the inner chamber means 138a, 140a and 152a (138, 140 and 152), and thus poppet orifice means 154a (154), still have a positive fluid pressure therein.

Further, the invention, through the use of different diameters of cylindrical portions 126a (126) and 128a (128) enables the control port or passage means 176a (176) to have the fluid therein be at a value or magnitude equal to 100.0% of supply pressure, $P_1$, without requiring the pressure of the fluid within chamber means 140a (140) and 138a (138) to be at a magnitude of 100.0% of supply pressure, $P_1$. It has also been determined that good operating characteristics are obtained when the ratio of the diametrical dimensions of the outer cylindrical surfaces 126 and 128 are within a range of ratios of 1.1 to 1.5; that is, the outer diametrical dimension of cylindrical surface 126, divided by the outer diametrical dimension of cylindrical surface 128 would be in the range of values ob 1.1 to 1.5. The same applies to cylindrical surfaces or portions 126a and 128a. In the preferred embodiments the ratio of the diametrical dimensions of cylindrical surface 126 to cylindrical surface 128, and, cylindrical surface 126a to cylindrical surface 128a was, in each case, selected to be in the order of 1.3.

Still further, referring to either FIGS. 1 or 2, let it be assumed that various valves and/or flow devices are in parallel branch circuit with respect to the depicted control means 178 or 178a. If for some reason one or more of such assumed valves and/or flow devices were to open in a manner causing the magnitude of $P_c$ to, undesirably, decrease, the invention will automatically correct for such decrease. For example, referring to FIG. 1, if $P_c$ in conduit 180 were to start diminishing in magnitude, the fluid in the control chamber 136 would also diminish in pressure; this would then cause spool valve 124 to become unbalanced and move downwardly, as viewed in FIG. 1, causing the regulating surface 115 to move in a direction of further closing flow from control chamber 136 to exhaust conduit means 184—184, and causing regulating surface 113 to move in a direction of further increasing the flow and pressure of fluid from annulus 166 to control chamber 136. Such action would continue until $P_c$ was again at desired magnitude and spool valve 124 again achieved equilibrium. The same automatic correction, as described, would of course occur in the embodiment of FIG. 2.

The operation of the pressure regulating valving assembly 10a of FIG. 2 is generally similar to the embodiment of FIG. 1.

Generally, the pressure regulating valving assembly 10a controls and/or determines fluid output pressure, in response to an electrical current, as by returning a portion of such fluid to, for example, sump. More particularly, an electrical signal, in which the magnitude of the current may be an indication of a sensed condition or an indication of the then desired operation of the control means 178a is applied to the field winding 28a as by terminals 30a and 32a. This, in turn, creates a magnetic field with the path of the resulting flux being generally axially through pole piece 202, through flux ring portion 44a, through housing section 14a, through flux member 268, generally axially along armature means 204 and back to pole piece means 202.

The embodiment of FIG. 2 does not need to employ spring means such as at 88 of FIG. 1. That is, the regulating apparatus or device 10a of FIG. 2 has an aspect which is opposite to that of FIG. 1. More particularly, device 10 is one which contemplates that at zero or low magnitude of electrical input to field coil 28, spring 88 will maintain valving surfaces 156 and 158 effectively closed which, in turn, causes $P_c$ to be equal, or almost equal to $P_1$. Such a device 10 may be considered as being one wherein, normally, the output of which, as at 180, is "high".

In comparison, the apparatus or device 10a contemplates that: (a) the current flow through field coil means 28a will be opposite to that in coil means 28 and (b) upon application of a signal type current flow through field coil means 28a, armature means 204, member 214 and valve surface 156a will be urged toward seat member 148a and spool valve 124a.

Assuming that supply means 170a is supplying fluid at a pressure of $P_1$ and assuming that either a zero or low magnitude of current is supplied to coil means 28a, the supply fluid will pass through restriction 142a, through chamber means or passages 138a, 140a and 152a and, by its action against restriction means 108a, cause the armature means 204, member 214 and valving member surface 156a to move its furthermost distance away from valve seating surface 158a and spool valve means 124a. Consequently, the supply fluid flows, at a comparatively large rate of flow, between the cooperating spaced surfaces 156a and 158a and to sump as via 160a and conduits 162a—162a. Such flow between spaced surfaces 156a and 158a causes the magnitude of the pressure of the fluid in 138a, 140a and 152a to decrease (also due to the pressure drop across restriction 142a) thereby enabling spring 190a to move spool valve 124a generally upwardly (as viewed in FIG. 2) causing the regulating surface portion 113a to further reduce flow, from annulus 166a to control chamber 136a, and simultaneously causing the regulating surface portion 115a to further increase flow, from control chamber 136a to annulus 182a and sump via passages 184a. This results in the fluid in control chamber 136a being at or near its lowest permissible magnitude and such is conveyed as an output pressure to control means 178a.

The embodiment of FIG. 2 may be considered as a pressure regulating device which normally has a low pressure output.

As the magnitude of the current applied to field coil 28a increases, the resulting flux becomes sufficient to (in response to the magnitude of the applied current) cause the armature means 204 and valve surface 156a to move toward valve seating surface 158a. As a consequence the restrictive effect of the then closer spaced surfaces 156a and 158a increases causing the magnitude of the supplied fluid in chambers 138a, 140a and 152a to increase. Such, in turn, moves spool valve 124a generally away from valve seating surface 158a resulting in regulating surface 113a permitting an increase in flow from annulus 166a and simultaneously resulting in regulating surface 115a causing a reduction in flow from control chamber means 136a to sump via annulus 182a and conduit means 184a.

As in the embodiment of FIG. 1, so too, restriction means 108a and restriction passage means 110a permit a relatively small rate of flow of fluid into and through passage or conduit means 106a as to fill chamber 206 as well as other available space (for example, between elements relatively movable to each other). An outflow restriction means, comprised of extension 208, member 230 and cooperating surfaces 228 and 232, serves to control the rate of flow of fluid therethrough and, via conduit or passage means 224, 226, 234, 236 and 238, to sump. The member 230 is adjusted as to present juxtaposed surfaces 228 and 232 to each other at a distance (or space therebetween) which will result in the desired rate of fluid flow therethrough. In the preferred embodiment, the rate of flow of fluid through such outflow restriction means is slightly less than the rate of flow through restriction passage means 110a. The purpose of restriction passage means 110a and the outflow restriction means is the same as already described in regard to 110, 90-78, 96, 102 and 92 of FIG. 1.

Further, as should now be apparent, the spool valve 124 (124a) accomplishes its overall regulating function without supplying a feed-back of fluid pressure as from control chamber means 136 (136a) to the functional outer axial end of valving body portion 127 (127a) of spool valve 124 (124a), a taught by said U.S. Pat. No. 4,966,195.

Also, by preferably placing the spring 190 (190a), about spool valve 124 (124a), so that said spring is located effectively between opposed axial ends of spool valve 124, the overall length of the device or apparatus 10 (10a) can be minimized as compared to, for example, said U.S. Pat. No. 4,966,195.

Although only preferred embodiments of the invention have been disclosed and described it is apparent that other embodiments and modifications of the invention are possible within the scope of the appended claims.

What is claimed is:

1. A pressure regulating assembly for regulating the pressure of a flowing fluid medium, comprising housing means, said housing means comprising a first housing portion and housing a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially confined between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, wherein the diametrical dimension of said first cylindrical valving portion is substantially different from the diametrical dimension of said second cylindrical valving portion, and resilient means normally resiliently urging said spool valve means in a direction generally toward further increasing communication between said annular chamber and said third fluid outlet passage means, wherein said diametrical dimension of said second cylindrical valving portion is substantially larger than said diametrical dimension of said first cylindrical valving portion, wherein said resilient means comprises mechanical spring means, and wherein said spring means is situated generally within said annular chamber.

2. A pressure regulating assembly for regulating the pressure of a flowing fluid medium, comprising housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially confined between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, wherein the diametrical dimension of said first cylindrical valving portion is substantially different from the diametrical dimension of said second cylindrical valving portion, and resilient means normally resiliently urging said spool valve means in a direction generally toward further increasing communication between said annular chamber and said third fluid outlet passage means, wherein said resilient means comprises mechanical spring means, and wherein said spring means is situated generally within said annular chamber.

3. A pressure regulating assembly according to claim 2 wherein said cylindrical inner chamber comprises a first inner cylindrical surface of a first diametrical dimension and a second inner cylindrical surface of a second diametrical dimension substantially different from said first diametrical dimension, wherein said second diametrical dimension is substantially larger than said first diametrical dimension, and wherein said first and second cylindrical valving portions are respectively received by said first and second inner cylindrical surfaces.

4. A pressure regulating assembly according to claim 2 wherein said field coil means is effective for producing a magnetic flux upon application of an electrical current to said field coil means, and wherein when a preselected magnitude of electrical current is flowed through said field coil means said armature means is moved as to most restrict flow of said fluid medium out of said fluid-flow passage means.

5. A pressure regulating assembly according to claim 2 wherein said field coil means is effective for producing a magnetic flux upon application of an electrical current to said field coil means, and wherein when a preselected magnitude of electrical current is flowed through said field coil means said armature means is moved as to least restrict flow of said fluid medium out of said fluid-flow passage means.

6. A pressure regulating assembly for regulating the pressure of a flowing fluid medium, comprising housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially confined between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to comunicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, wherein the diametrical dimension of said first cylindrical valving portion is substantially different from the diametrical dimension of said second cylindrical valving portion, and resilient means normally resiliently urging said spool valve means in a direction generally toward further increasing communication between said annular chamber and said third fluid outlet passage means, wherein said field coil means is effective for producing a magnetic flux upon application of an electrical current to said field coil means, wherein when a preselected magnitude of electrical current is flowed through said field coil means said armature means is moved as to most restrict flow of said fluid medium out of said fluid-flow passage means, and wherein said resilient means comprises a coiled compression spring situated in said annular chamber and circumferentially about said axially extending body means.

7. A pressure regulating assembly according to claim 6 and further comprising spring means carried generally within said annular chamber, and wherein said coiled compression spring is at one functional end thereof operatively engaged with said spring perch and at an other functional end thereof operatively engaged with said second generally cylindrical valving portion.

8. A pressure regulating assembly for regulating the pressure of a flowing fluid medium, comprising housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially confined between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for generally control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, wherein the diametrical dimension of said first cylindrical valving portion is substantially different from the diametrical dimension of said second cylindrical valving portion, and resilient means normally resiliently urging said spool valve means in a direction generally toward further increasing communication between said annular chamber and said third fluid outlet passage means, wherein said field coil means is effective for producing a magnetic flux upon application of an electrical current to said field coil means, wherein when a preselected magnitude of electrical current is flowed through said field coil means said armature means is moved as to least restrict flow of said fluid medium out of said fluid-flow passage means, and wherein said resilient means comprises a coiled compression spring situated in said annular chamber and circumferentially about said axially extending body means.

9. A pressure regulating assembly according to claim 8 and further comprising second spring means, said second spring means being operatively connected to said armature means as to resiliently urge said armature means to a position as to most restrict flow of said fluid medium out of said fluid-flow passage means.

* * * * *